United States Patent [19]

Pasbrig

[11] Patent Number: 4,889,320
[45] Date of Patent: Dec. 26, 1989

[54] APPARATUS FOR DETACHABLY CLAMPING, TENSIONING AND SECURING ROPES, CABLES, WIRES, BELTS OR THE LIKE

[75] Inventor: Max Pasbrig, Orselina, Switzerland
[73] Assignee: Lacrex Brevetti S.A., Orselina, Switzerland
[21] Appl. No.: 209,831
[22] Filed: Jun. 22, 1988

[30] Foreign Application Priority Data
Jun. 22, 1987 [DE] Fed. Rep. of Germany ....... 8708661

[51] Int. Cl.$^4$ ............................................. B66F 3/00
[52] U.S. Cl. .................................. 254/252; 24/136 L; 254/264
[58] Field of Search ............. 24/136 R, 136 L, 136 A; 254/252, 264, 389, 250, 251

[56] References Cited

U.S. PATENT DOCUMENTS

| | | | |
|---|---|---|---|
| 2,632,932 | 3/1953 | Blake | 24/136 A |
| 3,517,420 | 6/1970 | Anzini | 24/136 A |
| 3,628,221 | 12/1971 | Pasbrig | 24/136 R X |
| 3,709,071 | 1/1973 | Moransais | 24/136 A X |
| 4,129,927 | 12/1978 | Anderson | 24/136 A |

FOREIGN PATENT DOCUMENTS 1266384  4/1968  Fed. Rep. of Germany .

Primary Examiner—Joseph J. Hail, III
Assistant Examiner—Katherine Matecki

[57] ABSTRACT

A thick-walled housing has a longitudinal hole with an end orifice that runs in the axial direction of the housing. A spring-loaded clamping unit is axially displaceable in the hole. An oblique hole in the housing obliquely opens into the longitudinal hole. The clamping unit clamps a rope fed through the end orifice of the longitudinal hole and emerging through the oblique hole. The clamping unit has an axial projection on each side. The housing has guide slots located opposite one another that guide the axial projections. The ends of the axial projections form handles that pass through and extend beyond the housing. The clamping unit consists of a front and rear roller and a bearing part connecting the rollers one behind the other. The diameter of the front roller is smaller and depends on its forward displacement. The axial projections are provided on the larger rear roller.

8 Claims, 8 Drawing Sheets

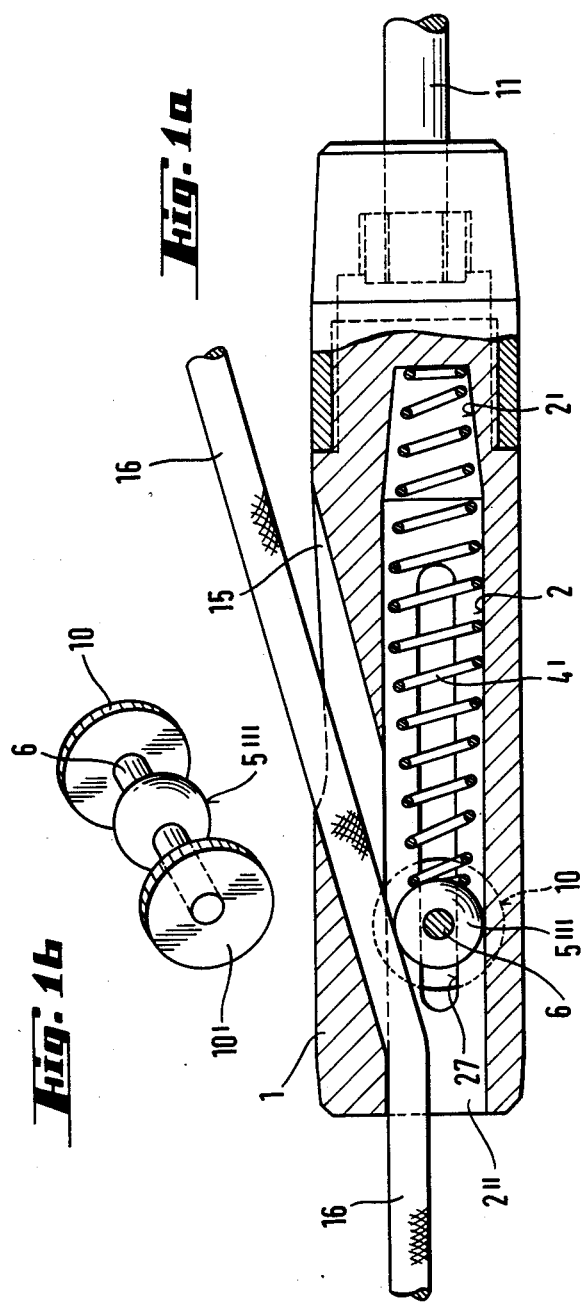

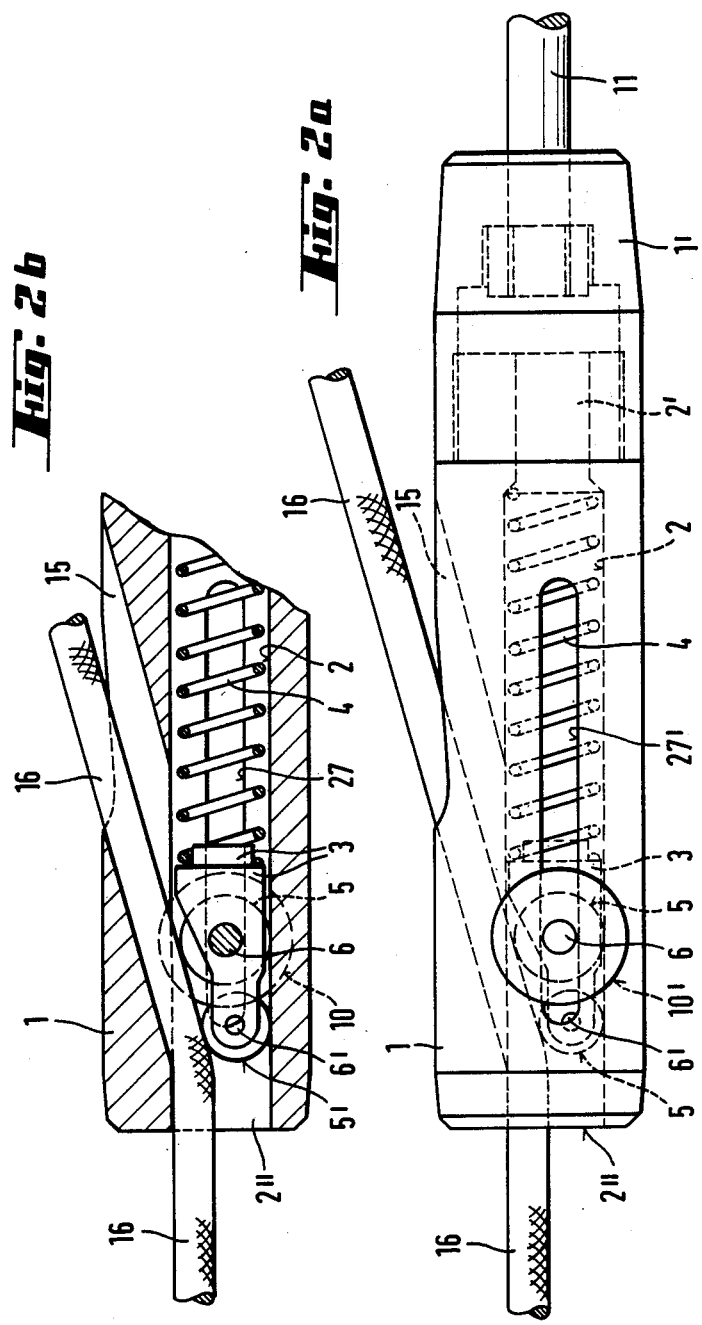

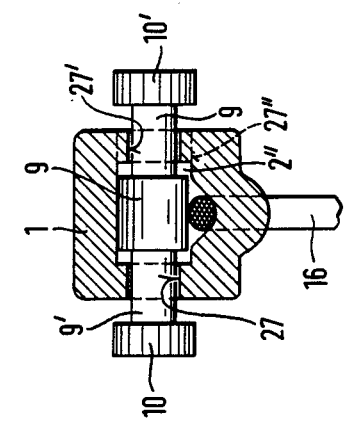
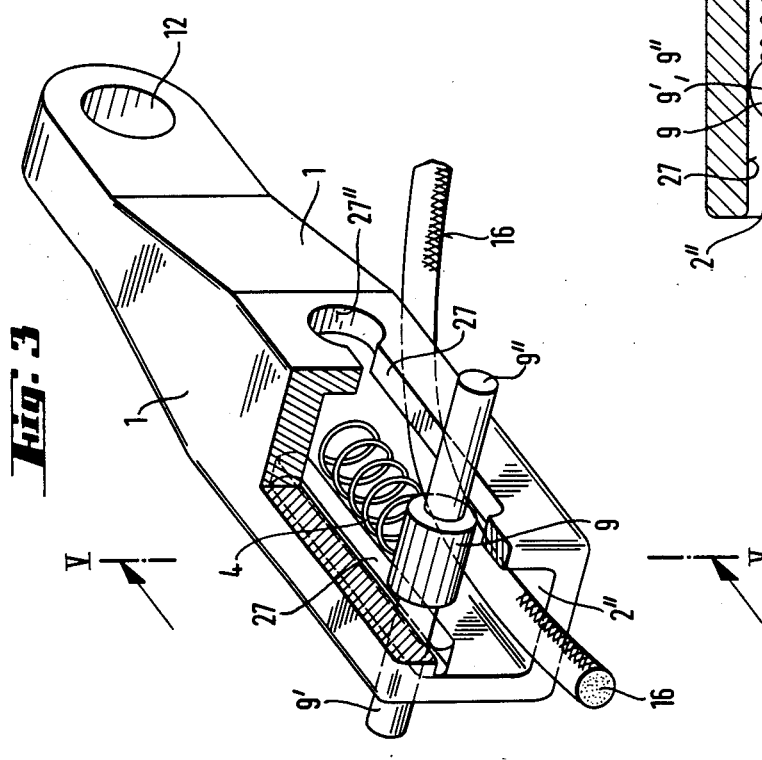
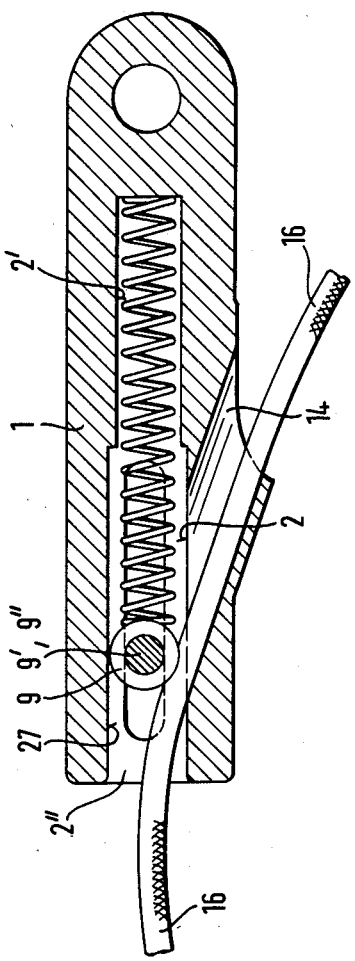

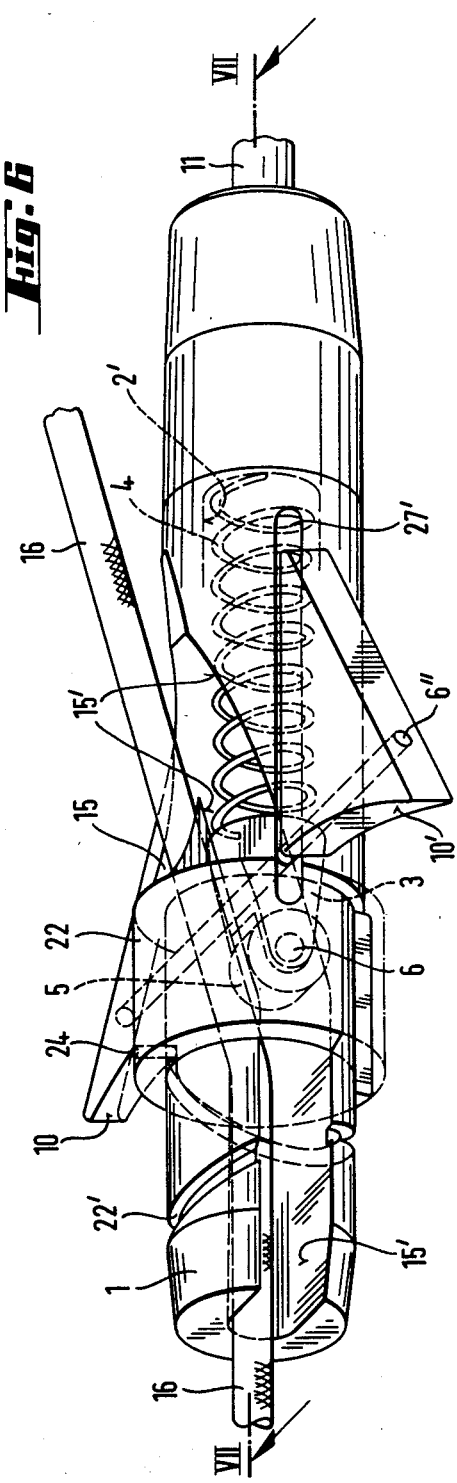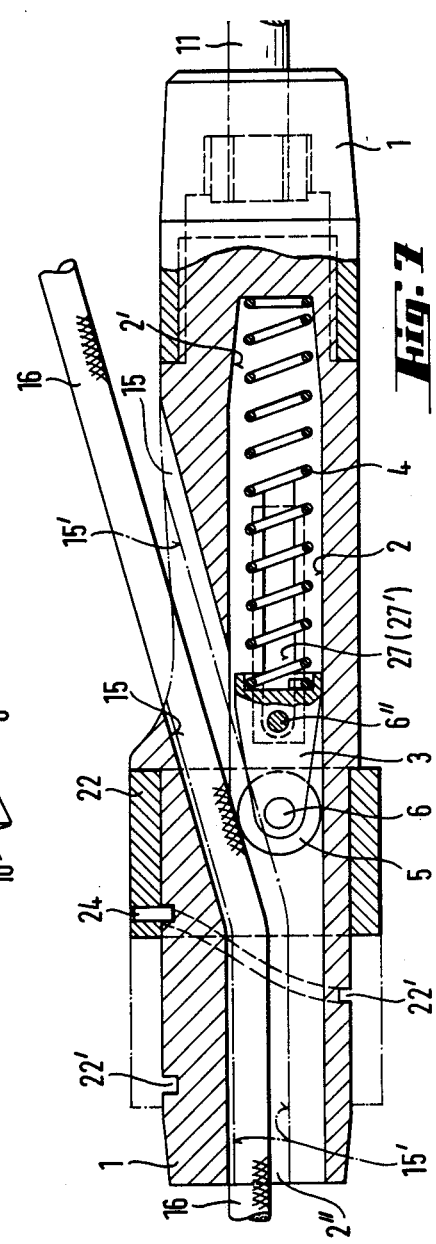

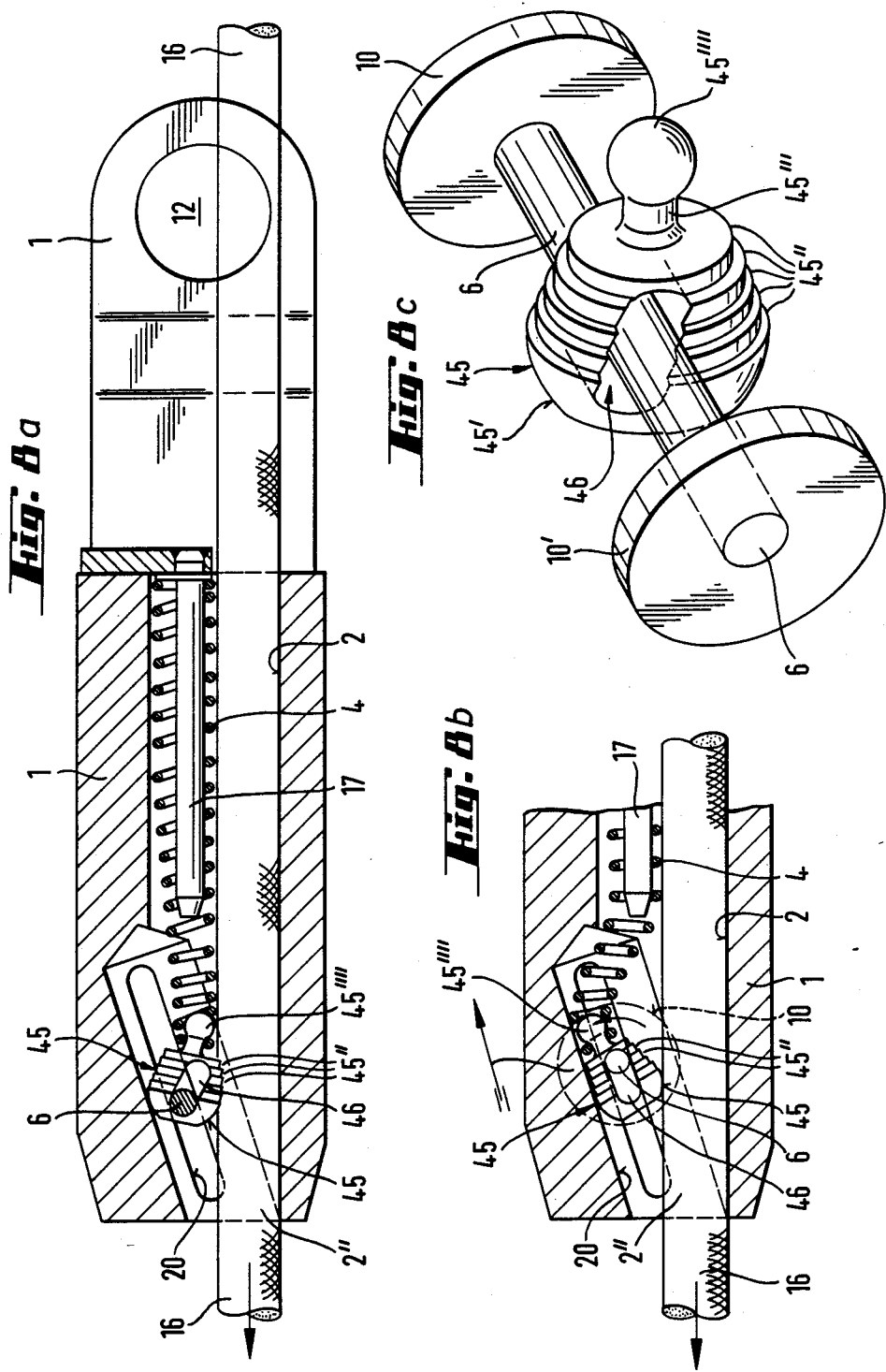

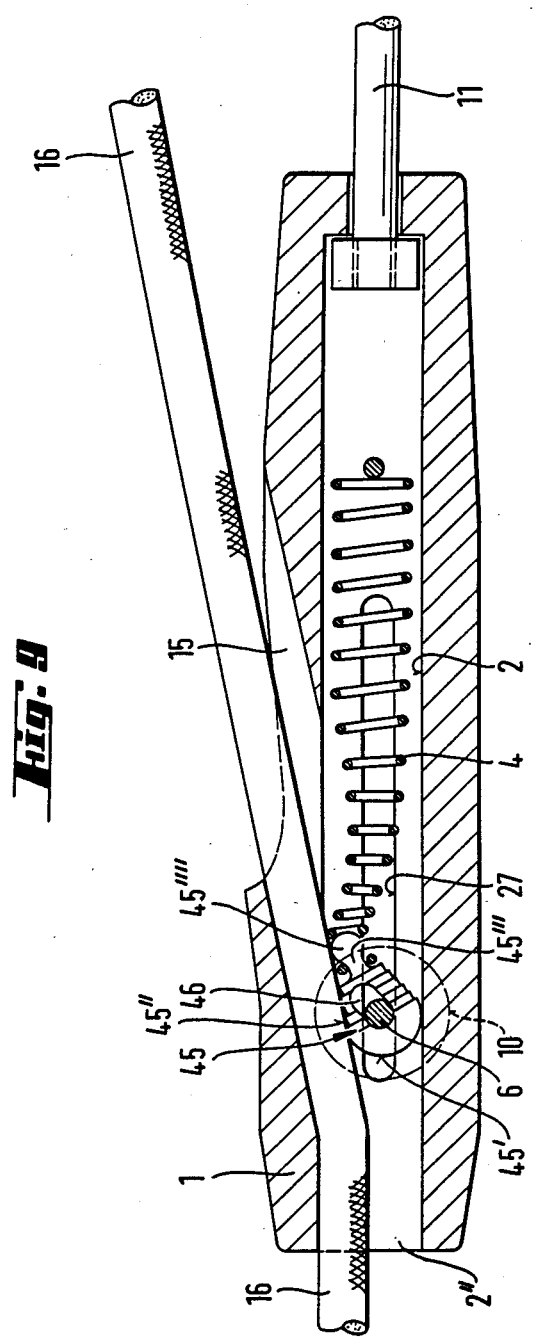

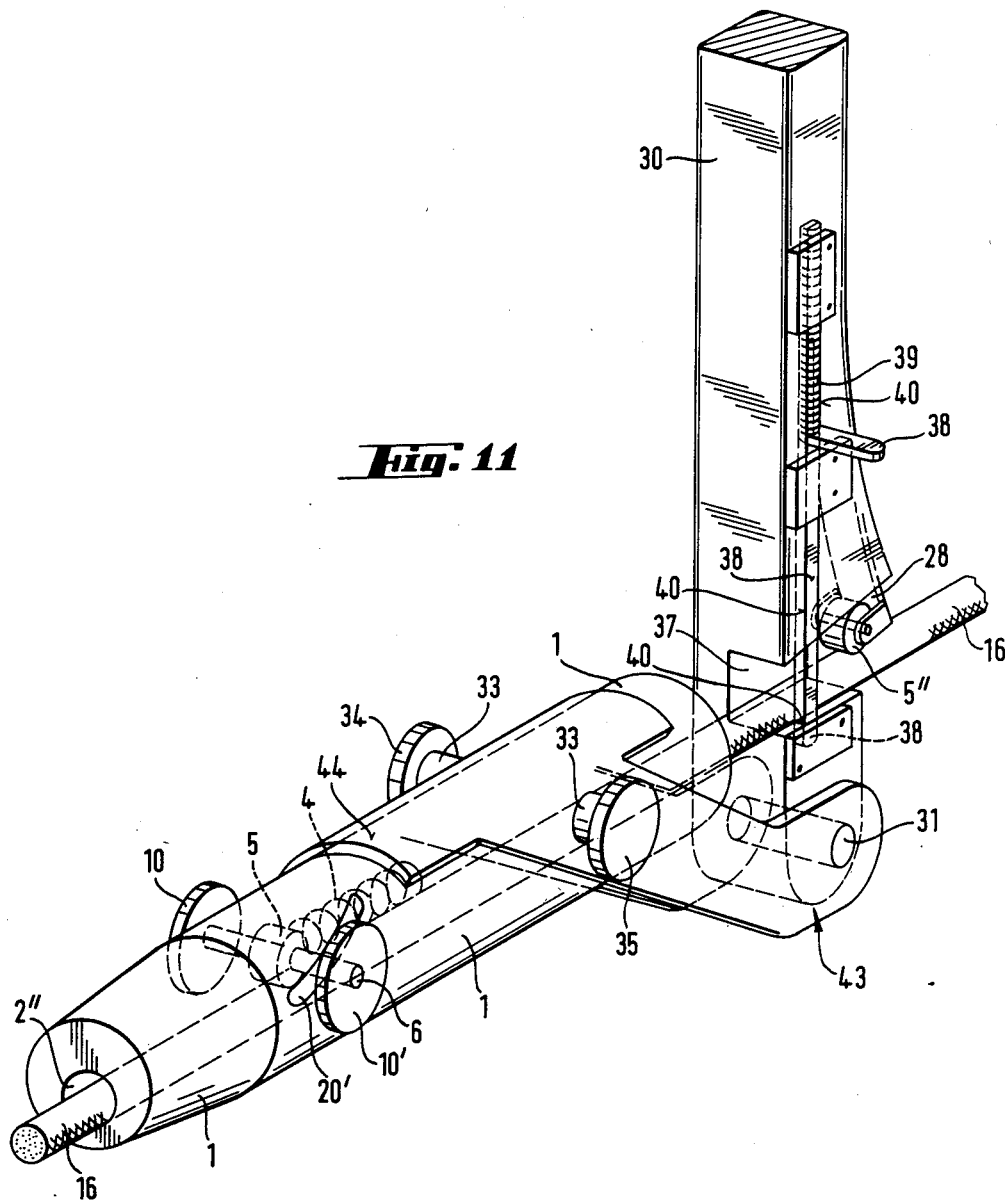

APPARATUS FOR DETACHABLY CLAMPING, TENSIONING AND SECURING ROPES, CABLES, WIRES, BELTS OR THE LIKE

The invention relates to an apparatus for detachably clamping, tensioning and securing ropes, cables, wires, belts or the like.

BACKGROUND OF THE INVENTION

In a known apparatus of this type for detachably fastening a cable under tension (German Pat. No. 1,266,384), a clamping unit pressed by a coil spring against the tapering end of the sleeve is held in a thick-walled sleeve having an inner hole in such a way that the said clamping unit is axially displaceable and so that this unit is self-locking and clamps in the hole a cable inserted into the sleeve via an end orifice. The coil spring tapers conically towards the clamping unit. The sleeve is provided with a further hole for easy insertion and tensioning of the cable in an advantageous oblique position with respect to the inner hole, and furthermore a lever projecting through the sleeve serves for operation of the clamping unit. This lever consists of an angled wire section which engages a backward projection of the clamping unit. Since this clamping unit, which has a circular or semicircular cross-section, is matched to the hole, which is likewise circular, this lever generally ensures sufficient guidance of the clamping unit. However, a circular clamping unit has the disadvantage that it comes into contact with the rope to be clamped only with its relatively small peripheral curvature and the spring pressure in this case may be sufficient for secure clamping. On the other hand, a readily deformable rope may in turn be clamped so strongly that it is very difficult to release from this clamping position using the known lever. In another apparatus for detachably fastening a cable (German Pat. No. 1,302,092), the clamping unit is a roller which has a knurled circumference and sits in a displaceable bearing part which can be moved by means of a handle. The hole is shaped like the clamping unit in order to hold the latter. The coil spring engages the displaceable bearing part. Although the roller substantially prevents disadvantageous clamping positions, unclamping cannot always be effected rapidly and without particular force, even with the known handle.

SUMMARY OF THE INVENTION

It is the object of the invention to improve and facilitate guidance and release of the clamping unit in the case of a clamping unit of the type stated at the outset, even in the case of a more powerful clamping action.

This object is achieved in an apparatus having the following features: a thick-walled housing with a longitudinal hole with an end orifice, which longitudinal hole runs in the axial direction, of the housing, and a spring-loaded clamping unit axially displaceable in the longitudinal hole, an oblique hole in the housing that obliquely opens into the longitudinal hole, the clamping unit clamping in the longitudinal hole a rope fed through the end orifice of the longitudinal hole and emerging through the oblique hole, the clamping unit having opposite sides with an axial projection on each of its opposite sides, the housing having guide slots located opposite one another that guide the axial projections, the ends of the axial projections forming handles that pass through and extend beyond the housing that serve for displacing the clamping unit, the clamping unit consisting of a front and a rear roller and a bearing part connecting the rollers one behind the other, the diameter of the front roller being smaller than the diameter of the rear roller the axial projections being provided on the larger rear roller.

By equipping a clamping unit with axial projections which are guided in the sleeve and project laterally beyond the said unit, the clamping unit is exactly guided and canting is prevented, in particular for circular or spherical clamping units. The axial projections mounted directly on the clamping unit transmit the force employed for unclamping directly to the clamping unit. By dispensing with intermediate members, the clamping apparatus is also simplified and is thus more reliable and less susceptible to problems.

BRIEF DESCRIPTION OF THE DRAWINGS

The invention is described in detail below with reference to preferred embodiments, which are also shown in the drawing. FIG. 1a shows a longitudinal section through a first clamping apparatus, FIG. 1b shows a perspective view of an associated clamping unit, FIG. 2a shows a side view of a further clamping unit, FIG. 2b shows a section through the front section of this apparatus, FIG. 3 shows a perspective view of a clamping apparatus having a rectangular cross-section, partially cut away, FIG. 4 shows a longitudinal section of this, FIG. 5 shows a section along the line V—V of FIG. 3, FIG. 6 shows a side view of another clamping apparatus having a lateral insertion slot for the rope, FIG. 7 shows a longitudinal section of FIG. 6, FIG. 8a shows a longitudinal section through a further clamping apparatus having a tiltably mounted clamping unit, in the clamping position, FIG. 8b shows a section through this apparatus, but in the release position, FIG. 8c shows a perspective view of this clamping unit on an enlarged scale, FIG. 9 shows a clamping apparatus having a tiltable clamping unit similar to FIG. 8a but with oblique rope feed, FIG. 10 shows a perspective view of a clamping apparatus having a tensioning means and FIG. 11 shows a clamping apparatus for straight rope guidance with an associated tensioning means.

DESCRIPTION OF PREFERRED EMBODIMENTS

Figure 10:
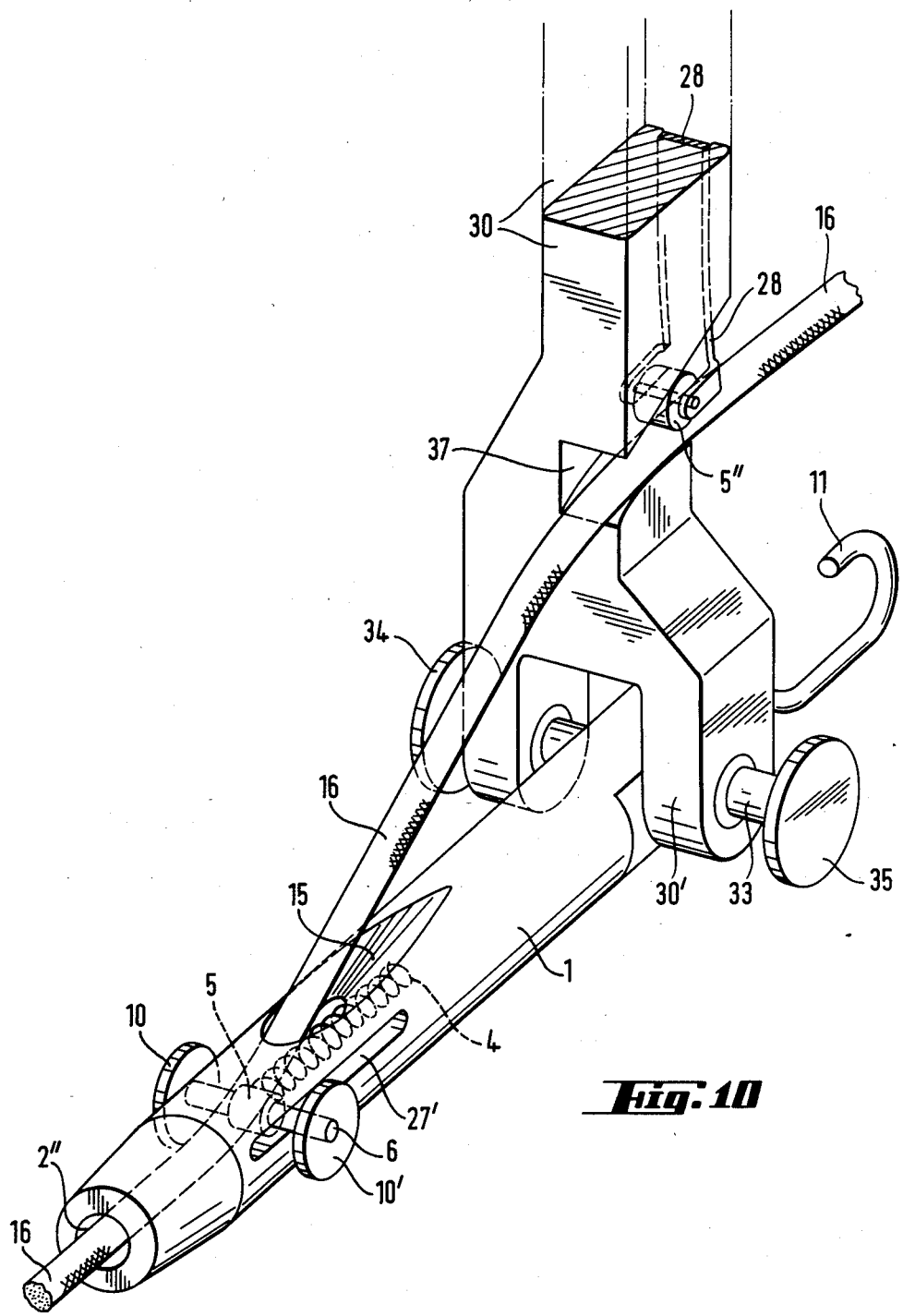

The clamping apparatus shown in FIG. 1a essentially comprises a housing 1 which has a circular cross-section and is provided at one end with a fastening organ 11, for example a hook. The elongated housing contains a longitudinal hole 2 whose inner hole end 2' tapers conically and which is open to the outside through an end orifice 2''' at the free end of the housing. An oblique hole 15 enters the longitudinal hole 2. In the housing, guide slots 27 opposite one another are arranged parallel to the hole axis and in the transverse plane with respect to the oblique hole. A clamping unit 5''' which is, for example, spherical and is guided in the guide slots 27 by its axial projections 6 on both sides is located in the longitudinal hole, at a distance from the end orifice 2''. Since the axial projections 6 project beyond the housing, these outer ends of the projection can be gripped in order to move the clamping unit. However, as shown in FIG. 1b, disk-shaped handles 10, 10' are advantageously mounted on these axial projections. A pressure spring 4' comes into direct contact with the clamping unit 5''', the spring coil of the said spring tapering conically at both its ends in order thus to facilitate compression and relaxation of the spring. A rope to be clamped which is fed through the oblique slot is designated by 16. In general, the rope 16 is inserted through the end orifice 2″ and deflected upward into the oblique hole 15 by the retracted clamping unit. Pulling at this end in order to clamp the rope causes the clamping unit 5‴ to roll backward in the longitudinal hole against the action of the pressure spring. If the rope clamped in this manner is released, the clamping unit is rolled forward under the force of the pressure spring, with the result that the rope is clamped. In order to accelerate the onset of the clamping effect and to reinforce the latter, the forward movement of the clamping unit into the clamping position can be further assisted by the handles 10. If it is intended to release the rope from the clamping position, the clamping unit is pushed backward again by means of the handles 10 and the axial projections 6 until the rope is sufficiently free.

The clamping apparatus according to FIG. 2a and 2b differs from the apparatus according to FIG. 1 essentially in that the clamping unit now consists of two clamping elements, advantageously in the form of rollers, the two clamping elements 5 and 5′ being held together by a bearing part 3 which comes into contact with the pressure spring 4. This pressure spring 4 is, in this case, wound in the form of a cylinder. The axial projections 6 engage the main clamping roller 5 and, as in FIG. 1, extend through the guide slots 27, 27′ to the outside, where once again handles 10, 10′ are pushed onto the outer ends. The rollers are provided with rough or knurled surfaces which grip the rope when the clamping unit is in the securing position. The clamping elements 5, 5′ have different diameters. Their axes 6, 6′ are parallel to one another but are displaced in such a way that the two rollers roll along the bottom of the longitudinal hole. Their diameters are matched to one another in such a way that the circumferential surfaces of the two rollers come into contact at about the same time with the rope to be clamped and ensure firmer clamping of the rope. Since the additional smaller roller 5′ as a rule engages the rope before the larger one, any slip of the rope is thus prevented. The fastening hook 11 is anchored to this housing 1 via a rotary head 1′.

The clamping apparatus shown in FIGS. 3 to 5 has a housing 1 which possesses a rectangular cross-section and furthermore has a longitudinal recess 2 which is rectangular or square in cross-section. The clamping unit itself consists of a roller 9 having a knurled circumferential surface which comes into direct contact with the pressure spring 4, which ends in a tapering inner hole 2′ as an extension of the rectangular recess 2. The clamping roller 9 expediently has a width which corresponds to the width of the longitudinal recess, so that the two end faces of the clamping roller are adjacent to the inner walls of the longitudinal recess, thus ensuring their guidance and substantially preventing canting. On the other hand, however, it is also possible to terminate the clamping roller 9 at a distance from the side walls of the recess, as shown in FIG. 5. The axial projections 9′ and 9″ once again project beyond the longitudinal slots 27, 27′ and, as shown in FIG. 5, can once again carry handles 10, 10′. The rope 16 to be clamped is in this case fed into the longitudinal recess through an oblique hole 14 pointing downward.

This clamping apparatus also shows how a sphere or roller provided with axial projections can be inserted into the longitudinal hole 2. For this purpose, at least one of the guide slots 27 is widened at the inner end to form an installation orifice 27‴, through which the roller or sphere can be inserted. Any handles to be mounted, such as gripping disks, are pushed onto the axial projections after insertion of the clamping unit. A fastening eye 12 is formed at the rear end of the housing.

FIGS. 6 and 7 show a clamping apparatus in which the roller-like clamping unit 5 is mounted in a bearing part 3. The clamping roller has a concave circumferential surface to prevent lateral slipping of the rope. The spring 4 comes directly into contact with the bearing part. Another difference compared with the clamping apparatuses described above, whose reference symbols also apply to this embodiment, is that the longitudinal/oblique hole 15 and the longitudinal hole section guiding the rope are slotted on one side to the outside of the housing, and the rope 16 can be inserted laterally through the slot 15′. This clamping apparatus can therefore be mounted on a rope which is already clamped or which is fastened at both ends. To prevent the rope from emerging through the open slot, a securing ring 22 is pushed onto the cylindrical housing and guided in a threaded groove 22′ of the housing by means of a guide pin 24. Since this securing ring likewise has a longitudinal slot (not shown), the rope can be inserted into the slot through the said longitudinal slot when the latter is in a forward position. If the securing ring is finally rotated back, the slot is covered and the rope is secured in the longitudinal hole. The axial projections 6″ are in this case mounted in the bearing part 3, and the handles 10, 10′ are wing-shaped.

FIGS. 8a, 8b and 8c show a clamping apparatus having a clamping unit 45 which consists of an approximately hemispherical head 45′, a stepped intermediate piece 45″, a neck piece 45‴ and a terminal sphere 45⁗. The terminal sphere is surrounded by the pressure spring 4, which is housed in the usual manner in the longitudinal hole 2 and for the major part is pushed onto a retaining pin 17. Expediently, this spring is wound so that it tapers conically toward the terminal sphere. The approximately drop-shaped clamping unit 45 is penetrated by a longitudinal eye 46 into which the axial projections 6 can be pushed. In this clamping unit, the axial projections extend through guide slots 20 arranged obliquely in the housing to the outside, where the usual hand disks, 10, 10′ can be mounted. The longitudinal hole 2 extends in this case through the entire length of the housing, in order to hold a straight rope. An attached hole extension piece serves to hold the actual clamping apparatus. In FIG. 8a, the clamping unit 45 is in the clamping position, i.e. the clamping unit presses with its head 45′ and also with the stepped intermediate piece 45″ against the rope because the said clamping unit is tipped about the axial projections 6 and hence a more extensive area of the said clamping unit presses against the rope. If the axial projections are pulled backward and hence move upward along the oblique slots 20 in order to release the rope, they also move backward in the tilt slot 46 of the clamping unit and thus raise the end of the clamping unit from the rope (FIG. 8b). This tilt position is achieved by means of the tilt slot 46, which is appropriately arranged in the clamping unit for this purpose. The clamping unit 45 together with the axial projections passing through it is shown on an enlarged scale in FIG. 8c.

FIG. 9 shows a clamping apparatus having a clamping unit according to FIGS. 8a to 8c, in which, however, the rope is fed through an oblique hole 15. The axial projections 6 are once again guided in guide slots 27 parallel to the longitudinal hole. If the axial projections 6 are pushed backward out of the clamping position 6 according to FIG. 9, they also move in the tilt slot 46 and cause the clamping unit to tilt backward so that only the spherical head is then in contact with the rope, and the rope is completely freed after a further backward push. The conically wound pressure spring 4 can readily follow this tilting movement of the clamping unit.

FIG. 10 shows a clamping apparatus having a tensioning means. This tensioning means is fastened to the housing 1 of the clamping apparatus by means of the fork-shaped end 30' of the tensioning lever 30, this being effected by means of the spring-loaded bolt 33 on one fork prong and a screw 34 on the other prong. Both the pin 33 and the screw 34 carry knurled disks 35 to facilitate operation. The screw 34 is adjusted to a certain diameter of the thick-walled sleeve 1. After the bolt has been drawn back, the fork-shaped end of the lever is placed on the sleeve and the screw and the bolt are then allowed to snap into the appropriate holes in the sleeve shell. The rope 16 which is fed through the claping apparatus and held by the clamping unit 5 is inserted into a slot 37 of the clamping lever. To ensure self-clamping, the slot is provided with a clamping unit 5" which is subjected to the action of a leaf spring 28. The clamping means formed by the clamping unit 5" and the spring 28 operates in exactly the opposite manner to the clamping means in the sleeve 1, i.e. when the clamping lever 30 is moved to and fro, one clamping means is engaged while the other is released from its self-locking position. To prevent the rope from sliding out of the slot 37 and also to protect the clamping unit 5", a securing slide (not shown) can be provided, as, for example, in FIG. 11. For clamping or tensioning the rope 16, the clamping lever 30 is brought into the operating position shown in the drawing. The rope is inserted into the slot 37 and clamped therein. By means of the force transmission during swiveling of the lever, the rope can be particularly readily tensioned.

In FIG. 11, a clamping apparatus having a straight rope passage and a clamping unit 5 guided in ascending oblique slots 20' is combined with a tensioning apparatus 30. Connection is effected by means of a supporting shell 44 having a guide fork 43 which is screwed to the housing 1 by means of the screw and bolt 33. The fork end 43 is pivotably connected to the lever end by means of the bearing pin 31. A clamping roller 5", which is pressed against the rope by a leaf spring 28, serves for firmly clamping the rope inserted into the lateral slot 37 of the clamping lever. By means of a securing slide 38, which is subjected to the force of a spring 39, the clamping position can be secured and the securing slide 38 can be brought into position in a groove 40 in the housing of the clamping lever so that the rope cannot emerge laterally. The operation and functioning of this clamping apparatus are as described above.

What is claimed is:

1. Apparatus for detachably clamping, tensioning and securing ropes, cables, wires, belts and the like comprising: a thick-walled housing with a longitudinal hole with an end orifice, which longitudinal hole runs in the axial direction of the housing, and a spring-loaded clamping unit axially displaceable in the longitudinal hole, the housing having an oblique hole that obliquely opens into the longitudinal hole, the clamping unit clamping in the longitudinal hole a rope fed through the end orifice of the longitudinal hole and emerging through the oblique hole, the clamping unit having opposite sides with an axial projection on each of its opposite sides, the housing having guide slots located opposite one another, through which the axial projections extend to guide the clamping unit, the ends of the axial projections forming handles that pass through and extend beyond the housing and serve for displacing the clamping unit, the clamping unit comprising a front roller and a rear roller and a bearing part connecting the rollers one behind the other with the front roller located between the end orifice and the rear roller the diameter of the front roller being smaller than the diameter of the rear roller and the axial projections being provided on the larger rear roller.

2. Apparatus for detachably clamping, tensioning and securing ropes, cables, wires, belts and the like comprising: a thick-walled housing with a longitudinal hole with an end orifice, which longitudinal hole runs in the axial direction of the housing, a spring-loaded clamping unit axially displaceable in the longitudinal hole, the housing having an oblique hole that obliquely opens into the longitudinal hole, the clamping unit clamping in the longitudinal hole a rope fed through the end orifice of the longitudinal hole and emerging through the oblique hole, the clamping unit having opposite sides with an axial projection on each of its opposite sides, the housing having guide slots located opposite one another, through which the axial projections extend to guide the clamping unit, the ends of the axial projections forming handles that pass through and extend beyond the housing and serve for displacing the clamping unit, and a pressure spring located in the longitudinal hole and directly engaging the clamping unit, the pressure spring having two ends and conically tapering coil windings at its two ends.

3. Apparatus as claimed in claim 2, wherein the clamping unit (45) consists of an approximately hemispherical head (45'), a stepped intermediate part (45), a neck piece (45''') and a terminal sphere (45''''), and the clamping unit is provided with a tilt slot (46) in which the axial projections (6) are displaceable, in order to tilt the clamping unit for clamping or release.

4. Apparatus as claimed in claim 3, wherein the guide slots (20) ascend obliquely in the housing sides in the direction of the release position, and the longitudinal hole (2) extends through the entire housing (1) in order to hold a straight rope (16) (FIG. 8a, 8b).

5. Apparatus as claimed in claim 2, wherein, in the case of rope feed through an oblique hole (15), the axial projections (6) mounted in the tilt slot (46) of the clamping unit (45) are guided in the guide slots (27) running parallel to the axis of the hole (FIG. 9).

6. Apparatus for detachably clamping, tensioning and securing ropes, cables, wires, belts and the like comprising: a thick-walled housing with a longitudinal hole with an end orifice, which longitudinal hole runs in the axial direction of the housing, a spring-loaded clamping unit axially displaceable in the longitudinal hole, the housing having an oblique hole that obliquely opens into the longitudinal hole, the clamping unit clamping in the longitudinal hole a rope fed through the end orifice of the longitudinal hole and emerging through the oblique hole, the clamping unit having opposite sides with an axial projection on each of its opposite sides, the housing having guide slots located opposite one another, through which the axial projections extend to guide the clamping unit, the ends of the axial projections forming handles that pass through and extend beyond the housing and serve for displacing the clamping unit, the longitudinal hole having a lateral insertion slot, the housing having an external thread, and a securing ring rotatable on the housing in the thread for closing the insertion slot, the clamping unit having a roller with a concave circumferential surface and a bearing part, the axial projections being mounted in the bearing part of the roller.

7. Apparatus as claimed in any one of claims 1, 2, or 6, wherein the handles mounted on the axial projections are wingshaped.

8. Apparatus as claimed in any one of claims 1, 2, or 6, comprising a tensioning means detachably fastened on the housing, which tensioning means comprises a clamping lever with a holding slot for the rope to be clamped, a clamping roller, and a leaf spring that subjects the clamping roller to pressure in the direction of the end orifice of the longitudinal hole, the clamping lever having a slot and a spring-loaded securing slide for the rope inserted into the slot.

* * * * *